United States Patent [19]

Storm

[11] 4,198,322
[45] Apr. 15, 1980

[54] ONE-STEP CURING METHOD FOR MANUFACTURE OF NEUTRON ABSORBING PLATES

[75] Inventor: Roger S. Storm, Williamsville, N.Y.

[73] Assignee: The Carborundum Company, Niagara Falls, N.Y.

[21] Appl. No.: 856,378

[22] Filed: Dec. 1, 1977

[51] Int. Cl.$^2$ .............................................. C04B 35/68
[52] U.S. Cl. ..................................... 252/478; 260/38; 264/331; 264/347; 525/4
[58] Field of Search ................ 264/331, 347; 260/838, 260/38; 252/478

[56] References Cited

U.S. PATENT DOCUMENTS

| | | | |
|---|---|---|---|
| 2,137,568 | 11/1038 | Cserny | 260/838 |
| 2,168,981 | 8/1939 | Flood et al. | 260/838 |
| 2,796,411 | 6/1957 | Zirkle | 252/478 |
| 2,796,529 | 6/1957 | Morrison | 250/108 |
| 2,928,948 | 3/1960 | Silversher | 252/518 |
| 2,942,116 | 6/1960 | Axelrad | 250/108 |
| 3,133,887 | 5/1964 | Alliegro | 252/478 |

*Primary Examiner*—James M. Derrington
*Attorney, Agent, or Firm*—David E. Dougherty; Robert C. Weber; Raymond F. Kramer

[57] ABSTRACT

A one-step curing method for the manufacture of neutron absorbing articles, such as those of long thin plate form for use in storage racks for spent nuclear fuel, includes curing a mixture of boron carbide particles, phenolic resin in liquid state and phenolic resin in particulate solid form at an elevated temperature to produce a neutron absorbing article containing at least 6% of $B^{10}$ content from the boron carbide thereof, 60% to 80% of boron carbide particles and 40% to 60% of irreversibly cured phenolic polymer, with the proportion of weight of phenolic resin in liquid state to that of phenolic resin in solid state being within the range of about 1:0.5 to 1:4, the temperature of the cure being in the range of about 130 to 200° C. and the cure being effected over a period of about two to twenty hours. Because of the use of solid resin, in particulate form, together with the resin in liquid state, the neutron absorbing articles made include better bonds between the polymer and the boron carbide particles than would be obtainable by using the normally solid resin only and the phenolic polymer content of the article is greater than that which would be obtainable by a one-step cure effected when the curable phenolic resin is all in the liquid state and the mixture is not held in article form under compacting or pressing pressure.

4 Claims, No Drawings

ONE-STEP CURING METHOD FOR MANUFACTURE OF NEUTRON ABSORBING PLATES

This invention relates to a method for manufacturing neutron absorbing articles. More particularly, it relates to the manufacture of such articles, preferably in plate form, which are intended for inclusion in assemblies, such as storage racks, for the storage of spent nuclear fuel.

Periodically nuclear fuels employed in nuclear reactors to produce power diminish in activity to such an extent that they have to be replaced so that the reactor in which they were employed may be operated at specification rate. Generally, the spent nuclear fuel is stored, at least temporarily, in pools wherein the emission of radioactivity is attenuated so that probability of harm to personnel about the storage area is minimized or at least, very significantly reduced. As described in U.S. patent application Ser. No. 854,966 of McMurtry, Naum, Owens and Hortman, entitled Neutron Absorbing Article and Method for Manufacture of Such Article, filed on Nov. 25, 1977, a useful way to increase the neutron absorbing capability of such a pool and also to enlarge its capacity is to utilize storage racks for the nuclear fuel wherein such fuel is surrounded by a boron carbide-phenolic polymer neutron absorber. The mentioned patent application describes such articles and a method for manufacture thereof. Following the method of that application the neutron absorbing article is made by pressing a mix of a liquid state phenolic resin and boron carbide particles into article (plate) form, curing the resin to an irreversible polymer at elevated temperature, further impregnating the cured article with additional polymer and curing such additional polymer to produce a strong, firm, yet sufficiently flexible final product, which is suitable for use in neutron absorbing applications, as in storage racks for spent nuclear fuels. In addition to use for absorbing neutrons from spent nuclear fuels the neutron absorbing articles may also be employed in other applications, such as for absorbing neutrons emitted by various nuclear materials, including fresh nuclear fuel, and absorbing neutrons from nuclear materials while they are being transported, rather than being stored.

The superiority of the neutron absorbing articles of the application mentioned over other neutron absorbers such as those described in U.S. Pat. Nos. 2,796,411; 2,796,529; 2,942,116; and 3,133,887, referred to in such other application, depends in large part on the uniform distribution of desirably sized boron carbide particles throughout a matrix of irreversibly cured phenolic resin wherein the resin tenaciously holds to the boron carbide particles, making a stable, yet sufficiently flexible structure to be long lasting and useful in the absorbing of neutrons from nuclear materials. In addition to such properties the absorbing articles made are sufficiently stable to be useful at the various temperatures encountered in racks for the storage of spent nuclear fuel, under the various temperature variations therein, under radiation from the nuclear fuel, in the presence of aluminum and stainless steel (no galvanic corrosion) and in the presence of water, which could contact it if the stainless steel enclosure for the neutron absorbing articles was to leak. Additionally, the absorbing power of the article is accurately controllable so that effective neutron absorption to a pre-calculated desirable extent is obtainable.

Although the method of the application previously described resulted in the production of a satisfactory neutron absorber, which met the requirements set forth above, the present single step method involves fewer operations, may be performed with less equipment and more quickly and produces as satisfactory an end product. In accordance with the present invention a one-step curing method for the manufacture of neutron absorbing articles comprises irreversibly curing, in desired article form, a mixture of boron carbide particles, curable phenolic resin in liquid state and curable phenolic resin in solid state and in particulate form at an elevated temperature so as to obtain bonding of the irreversibly cured phenolic polymer resulting to the boron carbide particles and to obtain a greater content of cured phenolic polymer in the article resulting than is obtainable by a one-step cure effected without holding the mixture under a compacting pressure when the curable phenolic resin employed is all in the liquid state. Thus, such a one-step curing method comprises irreversibly curing, in desired article form, a mixture of boron carbide particles, curable phenolic resin in liquid state and curable phenolic resin in solid state and in particulate form, the curable phenolic resin in liquid state being of a molecular weight in the range of 200 to 1,000, of a resin content of 50 to 90%, by weight, and of a solvent content of 5 to 30%, by weight, and the curable phenolic resin in the solid state being one of a molecular weight in the range of 1,200 to 10,000 and of a solvent content up to 3%, the proportion of curable phenolic resin in liquid state to curable phenolic resin in solid state being in the range of 1:0.5 to 1:4 by weight and the neutron absorbing article resulting being about 60 to 80% of boron carbide particles and 20 to 40% of irreversibly cured phenolic polymer, by weight. In preferred embodiments of the invention the method thereof is employed to make a neutron absorbing article which is in long, comparatively thin plate form, from boron carbide particles which contain little or no $B_2O_3$ and iron, and from phenolic resin which contains essentially no halogen, mercury, lead and sulfur. In the process of manufacture the boron carbide, phenolic resin and final product are kept away from contact with any halogens, mercury, lead or sulfur or compounds thereof.

The boron carbide employed should be in finely divided particulate form. This is important for several reasons, among which are the production of effective bonds to the phenolic polymer cured about the particles, the production of a continuous bonding of polymer with the boron carbide particles at the article surface and the obtaining of a uniformly distributed boron carbide content in the polymeric matrix. It has been found that the particle sizes of the boron carbide should be such that substantially all of it (over 95%, preferably over 99% and more preferably over 99.9%) or all passes through a No. 20 (more preferably No. 35) screen. Preferably, substantially all of such particles, at least 90%, more preferably at least 95%, pass through a No. 60 U.S. Sieve Series screen and at least 50% pass through a No. 120 U.S. Sieve Series screen. Although there is no essential lower limit on the particle sizes (effective diameters) usually it will be desirable from a processing viewpoint and to avoid objectionable dusting during manufacture for no more than 25% and preferably less than 15% of the particles to pass through a No. 325 U.S. Sieve Series screen and normally no more than 50% thereof should pass through a No. 200 U.S. Sieve Series screen, preferably less than 40%.

In addition to boron carbide particle size being of importance in the making of successful neutron absorbers of the present type it is highly desirable that the boron carbide be essentially $B_4C$. While the present inventor is aware that work at his assignee company has indicated that materials such as silicon carbide can be partially substituted for boron carbide in neutron absorbers of lower desired absorbing activity without loss of such lower absorbing properties and without deterioration of the physical properties of the article made, to obtain high neutron absorbing characteristics, which are often required for satisfactory spend fuel storage and for minimizing the dimensions of the assembly for such storage, it is normally considered important that the content of such compatible non-absorbing "filler", such as silicon carbide, should be limited and most of the time it is nil. However, the present single-stage method also may be used when silicon carbide is substituted for boron carbide, even to the extent that the $B^{10}$ content of the absorbing articles made is as low as 0.5%.

Boron carbide often contains impurities, of which iron (including iron compounds) and $B_2O_3$ (or impurities which can readily decompose to $B_2O_3$ on heating) are among the more common. Both of such materials, especially $B_2O_3$, have been found to have deleterious effects on the present products and therefore contents thereof are desirably limited therein. For example, although as much as 3% of iron (metallic or salt) may be tolerable in the boron carbide particles of the present high boron carbide content absorbers, preferably the iron content is held to 2%, more preferably to 1% and most preferably is less than 0.5%. Similarly, to obtain stable absorbing articles, especially in long, thin plate form, it is important to limit the $B_2O_3$ content (including boric acid, etc., as $B_2O_3$), usually to no more than 2%, preferably less than 1%, more preferably less than 0.5% and most preferably less than 0.2%. Of course, the lower the iron and $B_2O_3$ contents the better.

The boron carbide particles utilized will usually contain the normal ratio of $B^{10}$ but may also contain more than such proportion to make even more effective neutron absorbers. Of course, it is also possible to use boron carbide with a lower than normal percentage of $B^{10}$ (the normal percentage being about 18.3%, weight basis, of the boron present) but such products are rarely encountered and are less advantageous with respect to neutron absorbing activities.

Other than the mentioned impurities normally boron carbide should not contain other components than $B_4C$ in significant amounts, unless the $B_4C$ is intentionally diminished in concentration by use of a diluent or filler material, such as silicon carbide. Thus, for satisfactory absorbing effectiveness at least 90% of the boron carbide particles should be boron carbide, preferably at least 94% and more preferably at least 97% and the $B^{10}$ content of the article (from the boron carbide) will be at least 12%, preferably at least 14% (14.3% $B^{10}$ in pure $B_4C$). To maintain the stability of the boron carbide-phenolic polymer article made it is considered to be important to severely limit the contents of halogen, mercury, lead and sulfur and compounds thereof, such as halides, and so of course, these materials, sometimes found present in impure phenolic resins, solvents, fillers and plasticizers, will be omitted from those and will also be omitted from the composition of the boron carbide particles to the extent this is feasible. At the most, such particles will contain no more of such materials than would result in the final product just meeting the upper limits thereof, which will be mentioned in more detail in the following discussion with respect to the phenolic polymer and the resins from which it is made.

The solid irreversibly cured phenolic polymer, cured to a continuous matrix about the boron carbon particles in the neutron absorbing articles, is one which is made from a plurality of phenolic resins, one of which is in liquid state at normal temperatures and the other of which is a particulate solid at such temperatures. The phenolic resins constitute a class of well known thermosetting resins. Those most useful in the practice of the present invention are condensation products of phenolic compounds and aldehydes, of which phenolic compounds phenols and lower alkyl and hydroxy-lower alkyl substituted phenols are preferred. Thus, the lower alkyl substituted phenols may be of 1 to 3 substituents on the benzene ring, usually in ortho and/or para positions and will be of 1 to 3 carbon atoms, preferably methyl, and the hydroxy-lower alkyls present will similarly be 1 to 3 in number and of 1 to 3 carbon atoms each. Mixed lower alkyls and hydroxy-lower alkyls may also be employed but the total of substituent groups, not counting the phenolic hydroxyl, is preferably no more than 3. Although it is possible to make a useful product with the phenol of the phenol aldehyde resin being essentially all substituted phenol, some phenol may also be present, e.g., 5 to 15%. For ease of expression the terms "phenolic type resins", "phenol-aldehyde type resins" and "phenol-formaldehyde type resins" may be employed in this specification to denote broadly the acceptable types of materials described which have properties equivalent to or similar to those of phenol-formaldehyde type resins and trimethylol phenol formaldehyde resins when employed to produce thermosetting polymers in conjunction with boron carbide particles, as described herein.

Specific examples of useful "phenols" which may be employed in the practice of this invention, other than phenol, include cresol, xylenol and mesitol and the hydroxy-lower alkyl compounds preferred include mono-, di- and tri-methylol phenols, preferably with the substitution at the positions previously mentioned. Of course, ethyl and ethylol substitution instead of methyl and methylol substitution and mixed substitutions wherein the lower alkyls are both ethyl and methyl, and alkylols are both methylol and ethylol and wherein the alkyl and alkylol substituents are also mixed, are also useful. In short, with the guidance of this specification and the teaching herein that the presently preferred phenols are phenol and trimethylol phenol, other compounds, such as those previously described, may also be utilized, providing that the effects obtained are similarly acceptable. This also applies to the selection of the aldehydes and sources of aldehyde moiety employed but generally the only aldehyde utilized will be formaldehyde (compounds which decompose to produce formaldehyde may be substituted).

The phenolic or phenol formaldehyde type resins utilized are employed as either resols or novolaks. The former are generally called one-stage or single-stage resins and the latter are two-stage resins. The major difference is that the single-stage resins include sufficient aldehyde moieties in the partially polymerized lower molecular weight resin to completely cure the hydroxyls of the phenol to a cross-liked and thermoset polymer upon application of sufficient heat for a sufficient curing time. The two-stage resins or novolaks are initially partially polymerized to a lower molecular weight resin without sufficient aldehyde present for irreversible cross-linking so that a source of aldehyde, such as hexamethylene-tetramine, has to be added to them in order for a complete cure to be obtained by subsequent heating. Either type of resin may be employed to make phenolic polymers such as those described herein.

The liquid state resin employed is of low molecular weight, usually being the monomer, dimer or trimer. Generally the molecular weight of the resin will be in the range of 200 to 1,000, preferably 200 to 750 and most preferably 200 to 500. The resin will usually be employed as an aqueous, alcoholic or other solvent solution so as to facilitate "wetting" of the boron carbide particles and formation of a formable mass. While water solutions are preferred, lower alkanolic solutions such as methanol, ethanol and isopropanol solutions or aqueous solvent(s) solutions or dispersions are also usable. Generally the resin content of the liquid state resin preparation employed will be from 50 to 90%, preferably about 55 to 85%. The solvent content, usually principally water, may be from 5 to 30%, usually being from 7 to 20%, e.g., 8%, 10%, 15%, with the balance of liquid components normally including aldehyde and phenolic compound. Thus, for example, in a liquid unmodified phenolic resin of the single-stage type based principally on the condensation product of trimethylolphenol and formaldehyde, there may be present about 82% of dimer, about 4% of monomer, about 2% of trimethylol phenol, about 4% of formaldehyde and about 8% of water. When two-stage resins are employed the curing agent will also be included with the resin, in sufficient quantity to completely cure (crosslink) it. Such quantity can be 0.02 to 0.2 part per part of resin. To avoid ammonia production during curing a sufficient quantity of an aqueous solution of aldehyde or another suitable source thereof which does not release ammonia may be used for curing novolaks, instead of the usual hexamethylenetetramine.

The resins employed which are in the liquid state are usually in such state because of the low molecular weight of the condensation products which are the main components thereof but also sometimes due to the presence of liquid media, such as water, other solvents and other liquids which may be present. Generally the viscosity of such resins at 25° C. will be in the range of 200 to 700 centipoises, preferably 200 to 500 centipoises. Usually the resin will have a comparatively high water tolerance, generally being from 200 to 2,000 or more percent and preferably will have a water tolerance of at least 300%, e.g., at least 1,000%. Among the useful liquid products that may be employed are Arotap 352-W-70; Arotap 352-W-71; Arotap 8082-Me-56; Arotap 8095-W-50; Arofene 744-W-55; Arofene 986-Al-50; Arofene 536-E-56; and Arofene 72155, all manufactured by Ashland Chemical Company; PA-149, manufactured by Polymer Applications, Inc. and B-178; R3; and R3A, all manufactured by The Carborundum Company. All such resins will be modified when desirable (when contents of the following impurities are too high) to omit halides, especially chloride, halogens, mercury, lead and sulfur and compounds thereof or to reduce proportions thereof present to acceptable limits. In some cases the procedure for manufacture of the resin will be changed accordingly.

The particulate solid state resin will be of the same general type previously described for the liquid state component, with the exception that the resin will include very little or essentially no water or solvent, except possibly some small quantity of adsorbed liquid, e.g., 3% or less, and the molecular weight of the resin will be in the range of about 1,200 to 10,000 e.g., about 6,000 to 7,000. The water tolerance of such resin will be lower than that for the liquid resin, normally being less than 100% and the product will usually be essentially water insoluble. Generally the particle sizes of the solid state particles will be less than 140 mesh, U.S. Standard Sieve series and preferably over 95% will be of particle sizes less than 200 mesh, to promote ready mixing with the boron carbide particles and even dispersion in or with the liquid state resin.

Among the useful phenolic resin materials that may be employed in such particulate form that which is presently most preferred is Arofene-PDW-877, manufactured by Ashland Chemical Company but other resins, such as Arofenes 7214, 6745, 6753, 6781, 24780, 85678, 877LF, and 890LF, all made by Ashland Chemical Company, and PA-108 manufactured by Polymer Applications, Inc. and various other phenolic resins, such as described at pages 478 and 479 of the 1975-1976 Modern Plastics Encyclopedia, the manufacturers of which resins are listed at page 777 thereof, may be substituted. Many of such resins are two-stage resins, with hexamethylenetetramine (HMT) incorporated but single stage solids may also be used, as may be two-stage resins with other aldehyde sources included and those dependent at least partially on the liquid resin for the needed formaldehyde. Of course it is important that the selected resins (solid and liquid resin) be workable with the boron carbide particles to form a moldable mix and that they be satisfactorily curable under the conditions employed. Preferably, the solid state resin utilized will be of essentially the same chemical nature as the liquid state resin. For example, the phenols and aldehydes employed will be the same. However, it is within the invention to use different resin mixtures for both the liquid state and particulate solid resin components. The proportions of liquid state and particulate resins utilized will normally be in the range of 1:0.5 to 1:4, preferably 1:1 to 1:3, e.g., about 1:2.

Although the mentioned resins are preferred, a variety of other equivalent phenolic type resins, especially phenol formaldehydes, of other manufacturers and of the other types, may also be employed providing that they satisfy the requirements for making the molded neutron absorbing articles set forth in this specification.

As was previously mentioned, various objectionable impurities will preferably be omitted from the present articles and the components thereof. Additionally for most successful production of the present neutron absorbers, which should contain only very limited amounts, if any at all, of halogens, mercury, lead and sulfur, the content of $B_2O_3$, which may tend to interfere with curing, sometimes causing the "green" molded article to lose its shape during the cure, and which can have adverse effects on the finished article, will also preferably be limited. Generally less than 0.1% of each of the mentioned impurities (except the $B_2O_3$) are in the final article, preferably less than 0.01% and most preferably less than 0.005%, and contents thereof in the resins are limited accordingly, e.g., to 0.4%, preferably 0.04%, etc. To assure the absence of such impurities the phenol and aldehyde employed will initially be free of them, at least to such an extent as to result in less than the limiting quantities recited, and the catalysts, tools and equipment employed in the manufacture of the resins will be free of them, too. To obtain such desired results the tools and materials will preferably be made of stainless steel or aluminum or similarly effective non-adulterating material. Also usually non-volatile plasticizers, fillers and other components sometimes found present with the resins will be omitted,. The proportions of boron carbide particles and irreversibly cured phenol formaldehyde type polymer in the neutron absorbing article will normally be about 60 to 80% of the former and 20 to 40% of the latter, preferably with no other impurities, such as water, solvent, filler, plasticizer, halide or halogen, mercury, lead and sulfur being present or if any of such is present, the amount thereof will be limited, as previously described, and otherwise held to no more than 5% total. Preferably, the respective proportions will be 65 to 80% and 20 to, 35%, with presently most preferred proportions being about 70% and 30% or 74% and 26%, and with essentially no other components in the neutron absorber. Within the proportions described the product made has the desirable physical characteristics for use in storage racks for spent nuclear fuel, which characteristics will be detailed later. Also, the described ratios of boron carbide particles and phenolic resin permit manufacture by the simple, inexpensive, yet effective method of this invention.

To manufacture the present neutron absorbers, such as those in thin plate form, the boron carbide particles, powdered resin and liquid state resin are mixed together, compressed to "green" plate form and cured to final product condition. Various orders of addition of the three principal components may be employed but it is preferred to mix the boron carbide particles with the solid state resin until a satisfactory blend is obtained, which will usually take from one minute to twenty minutes, preferably two to ten minutes, after which the liquid resin may be blended with the mix, taking a similar time, until the blend appears to be uniform. The mix then may be spread out and allowed to dry somewhat, to remove some of the moisture and/or solvent in the liquid state resin, normally removing from ½ to 5 percent of resin weight, e.g., 1%, over from 5 minutes to one hour, e.g. 20 minutes. Normally, the resin-boron carbide mixture at this stage will be somewhat lumpy and is screened, often with a two to twenty mesh screen, e.g., four mesh. Should any lumps of aggregate be difficult to break up they may be crushed or ground, whichever appears more suitable. Of course, during the entire manufacturing procedure materials employed will be such that they will not give up objectionable impurities to the mix. Thus, normally, stainless steel, steel and aluminum will be the materials that come into contact with the mix, the articles made and intermediate products.

Next the desired, pre-calculated weight of grain-resin mixture is screened into a clean mold cavity of desired shape through a screen of 2 to 10 mesh size openings, preferably of 4 to 8 mesh openings, on top of a bottom plunger, aluminum setter plate, and glazed paper, glazed side to the mix, and is leveled in the mold cavity by sequentially running across the major surface thereof a plurality of graduated strikers. This gently compacts the material in the mold, while leveling it, thereby distributing the boron carbide and resin evenly throughout the mold so that when such mix is compressed it will be of uniform density and $B^{10}$ concentration throughout. A sheet of glazed paper is placed on top of the leveled charge, glazed side against the charge, and atop this there are placed a top setter plate and a top plunger, after which the mold is inserted in a hydraulic press and is pressed at a pressure of about 20 to 500 kg./sq. cm., preferably 35 to 150 kg./sq. cm., for a time of about 1 to 30 seconds, preferably 2 to 5 seconds. After removal from the molding press, plungers and plates on both sides of the pressed mixture, together with the pressed mixture, are removed from the mold together, the plungers and the setter plate are removed and the release papers are stripped from the pressed mixture. Fiberglass cloths are placed next to the molded item and then the green absorber plate and setter plates (usually aluminum) are reassembled, with fiberglass cloths between them. The assemblies are then inserted in a curing oven and the resin is cured. The cure may be effected with a plurality of sets of setter plates and green plates atop one another, usually three to ten, but curing may also be effected without such stacking.

The cure may be carried out in a pressurized oven, sometimes called an autoclave, but good absorber plates may also be made without the use of pressure during the curing cycle. The curing temperature is usually between 130° and 200° C., preferably 140° to 160° C., and the curing will take from 2 to 20 hours, preferably 2 to 10 hours and most preferably 3 to 7 hours. For best results the oven will be warmed gradually to curing temperature, which facilitates the gradual evaporation of any liquid from the green articles before the curing temperature is reached, thereby helping to prevent excessive softening of the green plate and loss of shape thereof. A typical warming period is one wherein over about 1 to 6 hours, preferably 2 to 4 hours, the temperature is gradually increased from room temperature (10° to 35° C.) to curing temperature, e.g., 149° C., at which temperature the green plate is held for a curing period, and after which it is cooled to room temperature at a regular rate over about 1 to 6 hours, preferably 2 to 4 hours, after which the cured article may be removed from the oven. When the oven is pressurized the pressure may often be from about 2 to 30 kg./sq. cm., preferably 5 to 10 kg./sq. cm. gas pressure, not compressing or compacting pressure.

Instead of heating from room temperature to curing temperature in the allotted period described above, if considered desirable to improve the physical state of the green plate before curing, it may be subjected to heating and drying in the oven at a temperature of about 52° C. for about 6 to 24 hours, e.g., 24 hours, before such temperature is raised to curing level.

In the process described an important consideration is to make the boron carbide-resin mix initially strong enough to adhere together during compacting and hold together during removal from the mold and then to raise the temperature to curing level in such a manner, desirably with some drying, so that when the curing temperature is reached, before the cure occurs, there will be no collapsing of the plate form and loss of its desired regularity of shape. By utilizing gas pressure on the article being cured any bleeding of resin can be counteracted, with the pressure tending to hold any liquefied resin inside the green plate or on the surface thereof until it is cured (but due to the relatively low content of liquid state resin present, bleeding is not usually any problem). By use of the setter plates, with or without stacking of the absorber plates to be cured, and due to the use of fiberglass cloth or equivalent separators between such setter plates and absorber plates, ready removal of the absorber plates from the setters is facilitated, good cures of undistorted plates are obtained, the plates made are flat and undesirable bleeding of resin is inhibited.

Although the neutron absorbing articles made in accordance with the invented process may be of various shapes, such as arcs, cylinders, tubes (including cylinders and tubes of rectangular cross-section), normally they are preferably made in comparatively thin, flat plates which may be long plates or which may be used a plurality at a time, preferably erected end to end, to obtain the neutron absorbing properties of a longer plate. Generally, to obtain adequately high neutron absorbing capability the articles will be from 0.2 to 1 cm. thick and plates thereof will have a width which is 10 to 100 times the thickness and a length which is 20 to 500 times such thickness. Preferably, the width will be from 30 to 80 times the thickness and the length will be 100 to 400 times that thickness.

The neutron absorbing articles made in accordance with this invention are of a desirable density, normally within the range of about 1.2 g./cc. to about 2.3 g./cc., preferably 1.3 to 1.9 g./cc., e.g., 1.5 g./cc. They are of satisfactory resistance to degradation due to temperature and due to changes in temperature. They withstand radiation from spent nuclear fuel over exceptionally long periods of time without losing their desirable properties. They are designed to be sufficiently chemically inert in water so that a spent fuel storage rack in which they are utilized could continue to operate without untoward incident in the event that water leaked into their stainless steel container. They do not galvanically corrode with aluminum and stainless steel and are sufficiently flexible to withstand seismic events of the types previously mentioned. Thus, they are of a modulus of rupture (flexural) which is at least 100 kg./sq. cm. at room temperature, 38° C. and 149° C., a crush strength which is at least 750 kg./sq. cm. at 38° C. and 149° C., a modulus of elasticity which is less than $3 \times 10^5$ kg./sq. cm. at 38° C. and a coefficient of thermal expansion at 66° C. which is less than $1.5 \times 10^{-5}$ cm./cm. ° C.

The absorbing articles made, when employed in a storage rack for spent fuel, as in an arrangement like that shown at FIGS. 1-3 of the McMurtry et al. patent application previously mentioned, are designed to give excellent absorption of slow moving neutrons, prevent active or runaway nuclear reactions and allow an increase in storage capacity of a conventional pool for spent fuel storage. The designed system is one wherein the aqueous medium of the pool is water at an acidic or neutral pH or is an aqueous solution of a boron compound, such as an aqueous solution of boric acid or buffered boric acid, which is in contact with the spent fuel rods although such rods are maintained out of contact with the present boron carbide-phenolic polymer neutron absorber plates. In other words, although the spent fuel is submerged in a pool of water or suitable aqueous medium and although the neutron absorber plates are designed to surround it they are normally intended to be protected by a sealed metallic or similar enclosure from contact with both the pool medium and the spent fuel.

The absorber plates made in accordance with this invention by the method described above are subjected to stringent tests to make sure they possess the desired resistances to radiation, galvanic corrosion, temperature changes and physical shocks, as from seismic events. Because canisters or compartments in which they can be utilized might leak they also should be inert or substantially inert to long term exposure to storage pool water, which, for example, could have a pH in the range of about 4 to 6, a chlorine ion concentration of up to 0.15 part per million, a fluoride ion concentration of up to 0.1 p.p.m., a total suspended solids concentration of up to 1 p.p.m. and a boric acid content in the range of 0 to 2,000 p.p.m. of boron. Also, the "poison plates" of this invention should be capable of operating at normal pool temperatures, which may be about 27° to 93° C., and even in the event of a leak in the canister should be able to operate in such temperature range for relatively long periods of time, which could be up to six months or sometimes, a year. Further, the product should be able to withstand $2 \times 10^{11}$ rads total radiation and should not be galvanically corroded in use and should not cause such corrosion of metals or alloys employed. In this respect, while normally ordinary 304 or 316 stainless steel may be used for structural members when seismic events are not contemplated, where such must be taken into consideration in the design of storage racks utilizing the present absorbers, high strength stainless steels will preferably be used.

The advantages of the present method over prior art methods, particularly that of the McMurtry et al. application referred to previously (which appears to be the closest prior art), are primarily with respect to the elimination of processing steps and the obtaining of a useful product which may be superior in some characteristics. The neutron absorbers made by the present method are as regular in shape as those made by the two-step process of the McMurtry et al. application and possess similar performance characteristics (although the modulus of rupture may sometimes be lower, it will be within the specifications given herein) but they appear to be superior in maintaining their desired physical properties when immersed in aqueous media. By practicing the present invention, utilizing a mixture of particulate solid and liquid resin, the full desired quantity of resin may be formulated initially with the boron carbide particles without destroying the integrity of the compacted green article and without excessive bleeding during curing and during drying or heating preliminary to such curing. Yet, the article made is satisfactorily cured and the boron carbide particles are tightly held by the resin matrix. The invented method obviates some screening operations, preliminary curing and impregnation and avoids the use of a plurality of ovens, an impregnating tank and vacuum. It represents a significant advance in the art of efficiently and economically manufacturing accurately reproducible absorber plates and articles. It allows the manufacture of such radiation resistant neutron absorbers of high and uniform capacity which may be employed to significantly increase the storage capacity of both pressurized water reactor and boiling water reactor spent nuclear fuels, normally in the form of rods. The absorbers made may be of the greater lengths described in the McMurtry et al. application, e.g., 0.8 to 1.2 meters, so fewer joints between plates are needed when plates are stacked one atop the other to form a continuous longer absorbing wall. Such desirable effects are obtainable using a variety of the phenolic resins, in combination, some of which may be one-stage and others of which may be two-stage, with mixtures thereof also being possible.

The following examples illustrate but do not limit the invention. In the examples and in this specification all parts are by weight and all temperatures are in °C., unless otherwise indicated.

EXAMPLE 1

1700 Grams of boron carbide powder and 484 grams of Ashland Arofene Resin PDW-877 are mixed at room temperature (25° C.) for five minutes to produce a homogeneous mixture. The boron carbide powder is one which has been previously washed with hot water and/or appropriate other solvents, e.g., methanol, ethanol, to reduce the boric oxide and any boric acid content thereof to less than 0.5% (actually 0.16%) of boric oxide and/or boric acid, as boric oxide. The powder analyzes 75.5% of boron and 97.5% of boron plus carbon (from the boron carbide) and the isotopic analysis is 18.3 weight percent $B^{10}$ and 81.7% $B^{11}$. The boron carbide particles contain less than 2% of iron (actually 1.13%), and less than 0.05% each of halogen, mercury, lead and sulfur. The particle size distribution is 0% on a 35 mesh sieve, 0.4% on 60 mesh, 41.3% on 120 mesh and 58.3% through 120 mesh, with less than 15% through 325 mesh. The PDW-877 resin (sometimes called 877 powder) is a 2-stage phenolic resin of about 90% solids content (based on final cross-linked polymer) having an average molecular weight of 6,000 to 7,000, a particle size distribution such that 98% or more passes through a 200 mesh sieve, and containing about 9% HMT. The resinous component may be either a condensation product of phenol or trimethylolphenol with formaldehyde. Next, over an additional five minute period 264 grams of Ashland Arotap Resin 358-W-70 are admixed with the pre-mix. The Arotap liquid resin, having a viscosity of 200 to 500 centipoises at 25° C., a molecular weight in the range of 200 to 500 and a water tolerance of about 1,000%, is principally (over 80%) a condensation product of trimethylolphenol and formaldehyde and contains about 82% of dimer, about 4% of monomer, about 2% of trimethylolphenol, about 4% of formaldehyde and about 8% of water. In preferred embodiments of the invention the resins contain less than 0.01% of each of halogen, mercury, lead and sulfur.

After completion of mixing, which is effected in a suitable steel mixer, and after standing for about an hour thereafter the mix is screened through a 4-mesh sieve and any lumps therein are broken up. Without further drying at this stage the mix is molded to desired plate absorber shape.

The molds employed comprise four sides of case hardened steel (brake die steel) pinned and tapped at all four corners to form an enclosure, identical top and bottom plungers about 2.5 cm. thick, made of T-61 aluminum and 1.2 cm. thick top and bottom aluminum tool and jig setter plates, each weighing about one kg. The molds, which had been used previously, are prepared by cleaning of the inside surfaces thereof and insertions of the bottom plunger, the bottom setter plate on top of the plunger and a piece of glazed paper, glazed side up, on the setter plate. A weighed charge (625 grams) of the boron carbide particles-resins mix fills the mold and is leveled in the mold cavity by means of a series of graduated strikers, the dimensions of which are such that they are capable of leveling from about an 11 mm. thickness to a desired 8 mm. mix thickness, with steps about every 0.8 mm. A special effort is made to make sure to fill the mold at the ends thereof so as to maintain uniformity of boron carbide distribution throughout. Thus, the strikers are initially pushed toward the ends and then moved toward the more central parts of the molds and they are employed sequentially so that each strike further levels the mix in the mold. A piece of glazed paper is then placed on top of the leveled charge, glazed side down and the top setter plate and top plunger, both of aluminum, are inserted.

The mold is then placed in a hydraulic press and the powder-resin mix is pressed. The size of the "green" plate made is about 15 cm. by 79.2 cm. by 3.4 mm. and the desntity thereof is about 1.5 g./cc. The pressure employed is about 143 kg./sq. cm. and it is held for three seconds. The pressure may be varied so long as the desired initial "green" article thickness and density are obtained. After completion of pressing the mold is removed from the press and at an unloading station a ram and a fixture force the plungers, setter plates and pressed mixture upwardly and through the mold cavity. The plungers, setter plates and glazed papers are then removed and the pressed mixture, in "green" article form, is placed between setter plates and intermediate layers of fiberglass cloth and cured. Curing is effected by heating from room temperature to 149° C. gradually and regularly over a period of three hours, holding at 149° C., for four hours and cooling to room temperature at a uniform rate for three hours. After curing the plates weigh 604 grams and their dimensions are essentially the same as after being pressed to green plate form.

The finished plates are of about 72% boron carbide particles and 28% phenolic polymer. When tested they are found to have a modulus of rupture (flexural), of at least 100 kg./sq. cm. at room temperature, 38° C. and 149° C. (163 kg./sq. cm. at 25° C.), a crush strength of at least 750 kg./sq. cm. at 38° C. and 149° C., a modulus of elasticity less than $3 \times 10^5$ kg./sq. cm. at 38° C. ($0.77 \times 10^5$ kg./sq. cm. at 25° C.) and a coefficient of thermal expansion at 66° C. which is less than $1.5 \times 10^{-5}$ cm./cm. °C. The neutron absorbing plates made are of satisfactory resistance to degradation due to temperature and changes in temperature such as may be encountered in normal uses as neutron absorbers, as in fuel racks for spent nuclear fuels. They are designed to withstand radiation from spent nuclear fuel over long periods of time without losing desirable properties and similarly are designed to be sufficiently chemically inert in water so that a spent fuel storage rack could continue to operate without untoward incident in the event that water should leak into a stainless steel or other suitable metal or other container in which they are contained in such a rack. They do not galvanically corrode and are sufficiently flexible, when installed in a spent nuclear fuel rack, to survive seismic events of the types previously mentioned.

When a similar experiment is run with the weight charged being 600 grams instead of 625 grams a similar product results, with similar physical and chemical characteristics, although about 0.1 mm. thinner. Similarly, when proportions and components are varied, as described in the foregoing specification, useful boron carbide-resin neutron absorbers may be made while varying the processing conditions as taught above. However, care will be exercised in selecting the type and quantity of the liquid state resin employed to make sure that it will satisfactorily mix with the powdered resin and the boron carbide particles to make a workable mix that is capable of being leveled in the mold and pressed to a uniform $B^{10}$ distribution plate (or other desired shape).

EXAMPLE 2

Following a procedure like that described in Example 1 but with additional drying before curing and with a somewhat longer curing cycle (9 hours) and different compacting pressures, 69 parts by weight of the boron carbide particles described, 20.4 parts of Ashland No. 877 powdered phenolic resin (Arofene 877) and 10.6 parts of Arotap 352-W-70 liquid state resin are pressed to plates like those of Example 1 and are tested for modulus of rupture and tensile strength. Using a compacting pressure of 148 kg./sq. cm. the modulus of rupture is 352 kg./sq. cm. and the elastic modulus is 73,000 kg./sq. cm. and at a compacting pressure of 296 kg./sq. cm. these figures are increased to 400 kg./sq. cm. and 86,000 kg./sq. cm., respectively. By modifying the compacting pressure and varying the proportions and types of components, primarily the resin composition, within the foregoing teachings, the physical properties may also be varied. In this example and in Example 1 the crush strength and the coefficient of thermal expansion are also within the ranges mentioned earlier in this specification.

EXAMPLE 3

Following the method of Example 2, 65 parts of boron carbide powder, 20 parts of the powdered resin and 12.9 parts of the liquid state resin are mixed and the mix is pressed at 148 kg./sq. cm.. The plates made are stored in water for one week at a temperature of 93° C., after which they are tested and are found to have a modulus of rupture of 233 kg./sq. cm. and an elastic modulus of 24,000 kg./sq. cm. The other required physical characteristics are equally satisfactory.

EXAMPLE 4

Laboratory test plates are made by essentially the same method as described in Examples 2 and 3, using 71 parts of the boron carbide powder, 9.2 parts of Polymer Applications, Inc. liquid state resin PA-149 and 19.8 parts of Polymer Applications, Inc. powder resin PA-108 and satisfactory plates are produced with the mentioned physical characteristics within the specifications mentioned.

Variations may be made in the procedures of the descriptions previously given, with respect to proportions of components, temperatures, pressures and times and successful neutron absorbing articles are still made. The moisture content in the resin mixtures employed will usually be from 0.5 to 5 parts, preferably 1 to 5 parts and, more preferably, 1 to 2 parts per 30 parts of resin mixture and the plates made will normally have a $B^{10}$ content of 8 or 8.5 to 11.5%.

The principal advantages obtained by the practice of this invention include quicker and simpler processing, which is less expensive, and the production of more usable and on-specification product because there is less breakage of the plates due to less handling and less damaging processing operations.

The invention has been described with respect to various illustrations and embodiments thereof but it is not to be limited to these because it is evident that one of skill in the art, with the present specification before him, will be able to utilize substitutes and equivalents without departing from the spirit of the invention.

What is claimed is:

1. A one-step curing method for the manufacture of neutron absorbing articles which comprises irreversibly curing, in desired article form, a mixture of boron carbide particles, curable phenolic resin in liquid state and curable phenolic resin in solid state and in particulate form, the curable phenolic resin in liquid state being of a molecular weight in the range of 200 to 1,000, of a resin content of 50 to 90%, by weight, and of a solvent content of 5 to 30%, by weight, and the curable phenolic resin in the solid state being one of a molecular weight in the range of 1,200 to 10,000 and of a solvent content up to 3%, the proportion of curable phenolic resin in liquid state to curable phenolic resin in solid state being in the range of 1:0.5 to 1:4 by weight and the neutron absorbing article resulting being about 60 to 80% of boron carbide particles and 20 to 40% of irreversibly cured phenolic polymer, by weight.

2. A method according to claim 1 wherein the neutron absorbing articles are in plate form, the boron carbide particles are of a particle size such that substantially all pass through a No. 20 U.S. Sieve Series screen, the proportions of the total of phenolic resins and boron carbide particles are such that the $B^{10}$ content of the plates is at least 6%, the proportion of phenolic resin in liquid state to phenolic resin in solid state in the curable mixture thereof with boron carbide particles and in the cured article made is within the range of 1:1 to 1:3, the resins are selected from the group consisting of 1- and 2-stage phenol formaldehyde type resins capable of being irreversibly heat cured at a temperature in the range of 130° to 200° C. and curing is effected at a temperature in such range to produce neutron absorbing plates which are utilizable in storage racks for spent nuclear fuel over a temperature range at which the spent nuclear fuel is stored, withstand thermal cycling from repeated spent fuel insertions and removals and withstand radiation from said spent nuclear fuel for long periods of time without losing desirable neutron absorbing and physical properties, are sufficiently chemically inert in water so as to retain neutron absorbing properties in the event of a leak allowing the entry of water into an enclosure for the plates and into contact with them in a storage rack for spent nuclear fuel, do not galvanically corrode and do not cause such corrosion and are sufficiently flexible so as to withstand operational basis earthquake and safe shutdown earthquake seismic events without loss of neutron absorbing capability and other desirable physical properties.

3. A method according to claim 2 wherein the boron carbide particles are substantially all of a size to pass through a No. 35 U.S. Sieve Series screen, they contain at least 12% of $B^{10}$, the proportions of boron carbide particles and total phenolic resin mixed are 65 to 80% of boron carbide particles and 20 to 35% of resins, the resins are accompanied by a total of 1 to 5% of aqueous medium, the mixture of boron carbide particles, phenol formaldehyde type resin and aqueous medium is compacted to plate shape of desired thickness and density at a pressure of about 20 to 500 kg./sq. cm. and the curing is effected over a period of about 2 to 20 hours to produce plates of a density in the range of 1.6 to 2.3 g./cc. containing from 8.5 to 11.5% of $B^{10}$.

4. A method according to claim 3 wherein the neutron absorbing plates made contain only boron carbide particles and phenol formaldehyde type resins, the boron carbide particles contain no more than 2 percent of iron and no more than 0.5% of $B_2O_3$, the phenol formaldehyde type resin in liquid state is over 50% trimethylol phenol resin and is of a molecular weight in the range of 200 to 750, the phenol formaldehyde type resin in solid state and particulate form is of a molecular weight in the range of about 6,000 to 7,000 and is 50 to 90% of the total of liquid state and solid state phenol formaldehyde type resins, the curable phenol formaldehyde type resins are resols substantially free of halogens, lead, mercury and sulfur, the irreversibly cured polymer is substantially free of halogens, lead, mercury sulfur, filler, plasticizer and solvent, at least 95% of the boron carbide particles pass through a No. 60 U.S. Sieve Series screen and at least 60% of such particles pass through a No. 120 U.S. Sieve Series screen, compacting is effected at a pressure of about 35 to 150 kg./sq. cm. for a period of about 2 to 5 seconds, after release of the compacting pressure curing is effected over a period of 2 to 10 hours at a temperature of 140° to 160° C. and the plates produced are of thickness from 0.2 to 1 cm., of a width from 10 to 100 times the thickness and a length from 20 to 500 times the thickness, the modulus of rupture thereof (flexural) is at least 100 kg./sq. cm. at room temperature, 38° C. and 149° C., the crush strength is at least 750 kg./sq. cm. at 38° C. and 149° C., the modulus of elasticity is less than $3 \times 10^5$ kg./sq. cm. at 38° C. and the coefficient of thermal expansion at 66° C. is less than $1.5 \times 10^{-5}$ cm./cm.°C.

* * * * *